(12) United States Patent
Stempnik et al.

(10) Patent No.: US 7,069,773 B2
(45) Date of Patent: Jul. 4, 2006

(54) MANIFOLD AIR FLOW (MAF) AND MANIFOLD ABSOLUTE PRESSURE (MAP) RESIDUAL ELECTRONIC THROTTLE CONTROL (ETC) SECURITY

(75) Inventors: Joseph M. Stempnik, Warren, MI (US); Colin A. Roberts, Holly, MI (US); Kerfegar K. Katrak, Fenton, MI (US); Paul A. Bauerle, Fenton, MI (US); Bruce A. Rogers, Novi, MI (US)

(73) Assignee: General Motors Corporation, Detroit, MI (US)

( * ) Notice: Subject to any disclaimer, the term of this patent is extended or adjusted under 35 U.S.C. 154(b) by 76 days.

(21) Appl. No.: 10/831,764

(22) Filed: Apr. 23, 2004

(65) Prior Publication Data

US 2005/0235743 A1    Oct. 27, 2005

(51) Int. Cl.
*G01M 15/00*    (2006.01)
(52) U.S. Cl. .................. 73/116; 73/118.1; 73/117.2; 73/117.3
(58) Field of Classification Search .................. 73/116, 73/117.2, 117.3, 118.1
See application file for complete search history.

(56) References Cited

U.S. PATENT DOCUMENTS

| | | | | |
|---|---|---|---|---|
| 5,270,935 A | * | 12/1993 | Dudek et al. | .................. 701/99 |
| 5,293,553 A | * | 3/1994 | Dudek et al. | ............... 701/102 |
| 5,621,167 A | * | 4/1997 | Fang-Cheng | ............... 73/118.1 |
| 5,714,673 A | * | 2/1998 | Bidner et al. | ................ 73/1.57 |
| 6,701,282 B1 | | 3/2004 | Ting et al. | ................. 702/185 |
| 6,748,313 B1 | * | 6/2004 | Li et al. | .................... 701/102 |
| 6,850,834 B1 | * | 2/2005 | Yu et al. | .................... 701/108 |
| 2005/0060084 A1 | * | 3/2005 | Dudek et al. | ............... 701/102 |

* cited by examiner

*Primary Examiner*—Edward Lefkowitz
*Assistant Examiner*—Freddie Kirkland, III
(74) *Attorney, Agent, or Firm*—Christopher DeVries

(57) ABSTRACT

An engine fault diagnostic system includes a diagnostic module that generates a manifold absolute pressure (MAP) error signal and that generates a mass air flow (MAF) error signal. A security module generates an air flow fault when the MAP error signal exceeds a MAP threshold and the MAF error signal exceeds a MAF threshold.

12 Claims, 3 Drawing Sheets

MANIFOLD AIR FLOW (MAF) AND MANIFOLD ABSOLUTE PRESSURE (MAP) RESIDUAL ELECTRONIC THROTTLE CONTROL (ETC) SECURITY

FIELD OF THE INVENTION

The present invention relates to engine control systems, and more particularly to engine control systems including an electronic throttle control (ETC) security system that is based on manifold air flow (MAF) and manifold absolute pressure (MAP) residuals.

BACKGROUND OF THE INVENTION

Vehicles driven by internal combustion engines generally employ intake system sensors including, but not limited to, a throttle position sensor (TPS), a mass airflow (MAF) sensor and a manifold absolute pressure (MAP) sensor. An engine control system implements an electronic throttle control (ETC) system that regulates engine torque output based on a throttle position signal, a MAF signal and a MAP signal. The engine control system can also regulate engine torque output using spark advance/retard, cam phasing and/ or regulating fuel supply to the cylinders.

The engine control system executes an ETC diagnostic system that determines whether the TPS, MAF and MAP sensors are functioning properly and are providing accurate readings. The ETC diagnostic system uses MAP and MAF residuals or error values to determine proper sensor function. In traditional engine control systems, the MAP and MAF errors can not be calibrated to meet ETC security requirements without resulting in false failures. Additional system redundancy is required to ensure that the failures intended to be detected by the ETC diagnostic do not exceed the ETC security probability of occurrence metrics. The additional redundancy increases vehicle production costs and false failures increase warranty costs.

SUMMARY OF THE INVENTION

Accordingly, the present invention provides an engine fault diagnostic system. The engine fault diagnostic system includes a diagnostic module that generates a manifold absolute pressure (MAP) error signal and that generates a mass air flow (MAF) error signal. A security module generates an air flow fault when the MAP error signal exceeds a MAP threshold and the MAF error signal exceeds a MAF threshold.

In other features, the engine fault diagnostic system further includes a MAP sensor that generates a MAP signal. The MAP error signal is determined based on an estimated MAP and the MAP signal.

In other features, the engine fault diagnostic system further includes a MAF sensor that generates a MAF signal. The MAF error signal is determined based on an estimated MAF and the MAF signal.

In another feature, the engine fault diagnostic system further includes a throttle position sensor that generates a throttle position signal. The security module determines the MAP threshold and the MAF threshold based on the throttle position signal.

In still another feature, the engine fault diagnostic system further includes a throttle module that calculates an estimated MAF based on a MAP signal and a throttle position signal. The MAF error signal is based on the estimated MAF and the MAF signal.

In yet another feature, the engine fault diagnostic system further includes an intake module that calculates an estimated MAP based on a MAF signal and a throttle position signal. The MAP error signal is based on the estimated MAP and the MAP signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
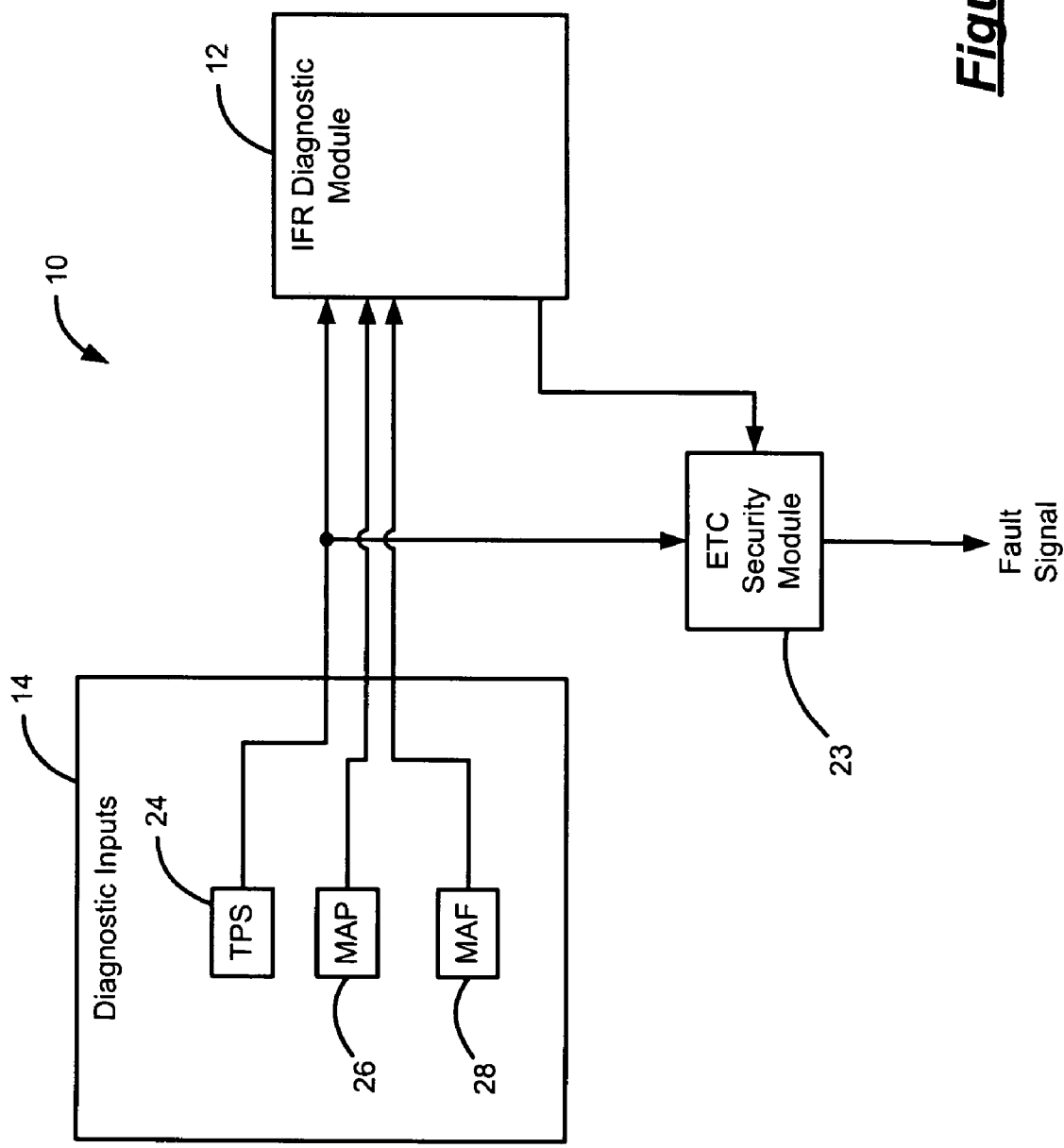
FIG. 1 is a functional block diagram of an engine fault diagnostic system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an engine fault diagnostic system 10 is illustrated. The diagnostic system 10 includes an intake flow rationality (IFR) diagnostic module 12 and data inputs 14. The IFR diagnostic module 12 includes a plurality of sub-modules used to perform the ETC security diagnostic steps, as described in further detail below. The engine fault diagnostic system 10 further includes an electronic throttle control (ETC) security module 23. The data inputs 14 include a throttle position sensor (TPS) 24, a manifold absolute pressure (MAP) sensor 26, a mass airflow (MAF) sensor 28, and other sensors (not shown). Signals generated by each sensor are provided to the IFR diagnostic module 12. The ETC security module 23 selectively generates an air flow fault signal based on outputs of the IFR diagnostic module 12, as will be described in further detail below.

The IFR diagnostic module 12 is described in detail in commonly assigned U.S. Pat. No. 6,701,282, issued on Mar. 2, 2004, the disclosure of which is expressly incorporated herein by reference. In general, the IFR diagnostic provides a "within range" rationality check for MAF, MAP and throttle position. The rationality check is an explicit model based diagnostic system that implements three separate models for an engine intake system (not shown). The models account for variable volumetric efficiency engines due to new features such as variable cam phasing and cylinder deactivation. The model structure makes use of analytic redundancy to improve diagnostic robustness against false fault indications and also to improve on board fault isolation when compared with the prior MAF-MAP and MAP-TPS rationality checks.

Figure 2:
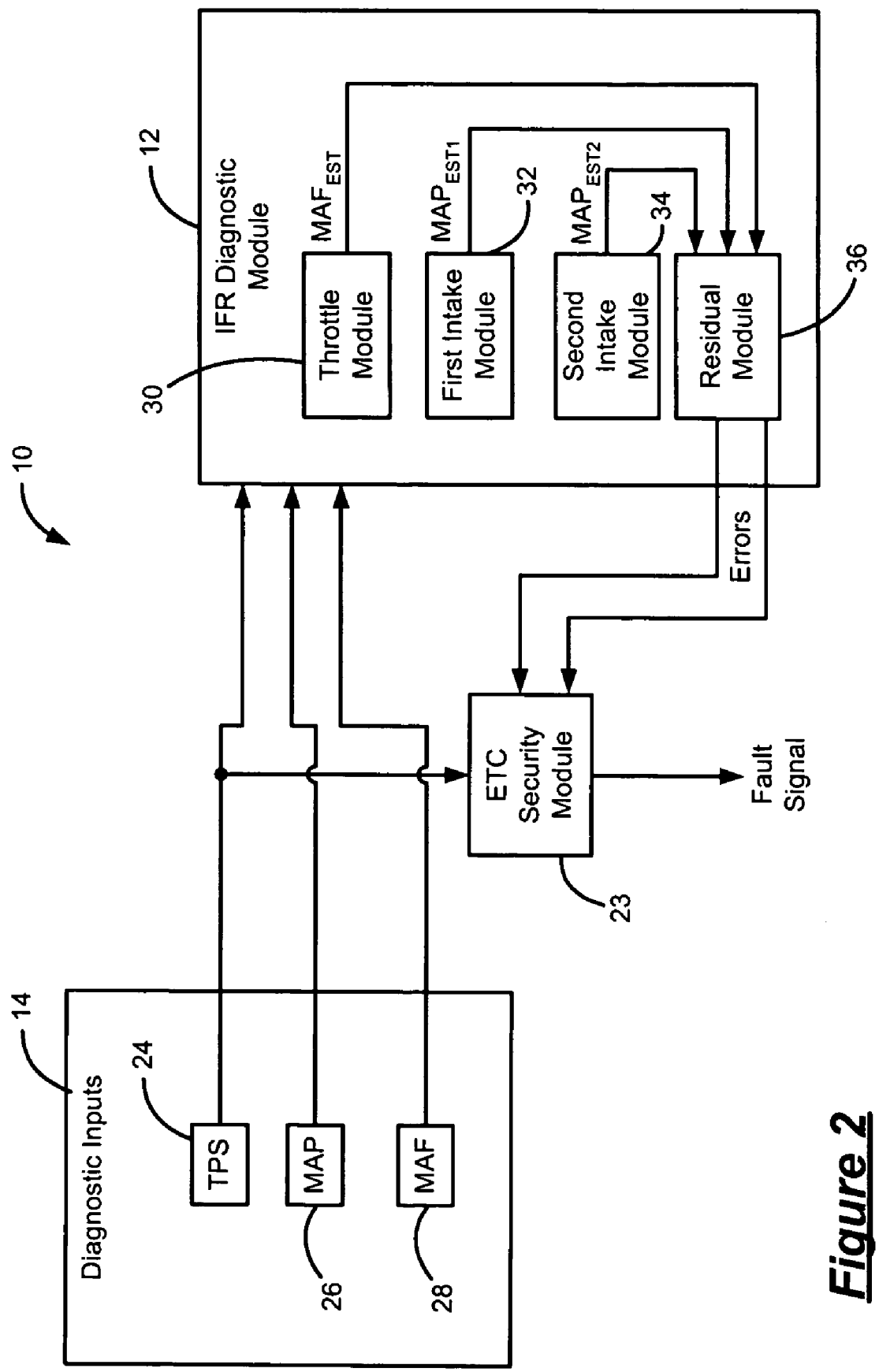
FIG. 2 is a functional block diagram showing further details of the engine fault diagnostic system of FIG. 1.

Referring now to FIG. 2, the IFR diagnostic module 12 includes a throttle module 30 that implements a throttle model. The throttle model describes the flow through a throttle body of the engine intake system and is used to estimate MAF based on ambient air pressure, estimated MAP, throttle position and/or intake air temperature (IAT). The throttle model is quasi-steady state and uses a first order lag filter to model dynamic air flow effects through the throttle body. The throttle model processes an effective throttle area of the throttle body, which is based on the throttle plate position.

The IFR diagnostic module 12 also includes a first intake module 32 that implements a first intake model. The first intake model describes the intake manifold and is used to estimate MAP based on MAF into the intake manifold (from the throttle body and exhaust gas recirculation (EGR)) and MAF from the intake manifold caused by engine pumping. The intake model is quasi-steady state and accounts for manifold dynamics by integrating the effect of small step flow changes with time. MAF into the manifold from the throttle is based on an estimate calculated from the throttle model, as discussed in further detail below. An engine flow model determines volumetric efficiency and uses the intake manifold model to properly account for the effects of altitude, cam phasing and/or cylinder deactivation. The intake model also uses a charge temperature model to account for the effect of EGR flow on the temperature of the gas in the intake manifold.

The IFR diagnostic module 12 further includes a second intake module 34 that implements a second intake model and a residual module 36. The second intake model is identical to the first intake model described above except that the MAF sensor is used instead of the throttle model for the throttle air input. The residual module 36 generates inputs to the ETC security module 23 based on the sensor signals and outputs of the throttle module 30, the first intake module 32 and the second intake module 34.

The throttle module 30 generates a mass airflow estimate ($MAF_{EST}$) based on the input signals and the throttle model. The first intake module 32 generates a first manifold absolute pressure estimate ($MAP_{EST1}$) based on the input signals and the first intake model. The second intake module 34 generates a second manifold absolute pressure estimate ($MAP_{EST2}$) based on the input signals and the second intake model. The residual module 36 compares $MAF_{EST}$, $MAP_{EST1}$ and $MAP_{EST2}$ obtained from the models to the actual values indicated by the MAF and MAP sensors respectively. More specifically, the residual module 36 determines three residuals or errors including a MAF error ($MAF_{ERROR}$), a first MAP error ($MAP_{ERROR1}$) and a second MAP error ($MAP_{ERROR2}$) based on $MAF_{EST}$, $MAP_{EST1}$ and $MAP_{EST2}$, respectively. The errors are each determined as the difference between the estimated values and the measured values indicated by the TPS, MAP and MAF sensor signals. $MAF_{ERROR}$ and $MAP_{ERROR1}$ are provided to the ETC security module 23.

The ETC security module 23 arbitrates $MAF_{ERROR}$ and $MAP_{ERROR1}$ to determine whether there is an air flow fault. More particularly, the ETC security module 23 compares $MAF_{ERROR}$ and $MAP_{ERROR1}$ to threshold values, $MAF_{THRESH}$ and $MAP_{THRESH}$, respectively. $MAF_{THRESH}$ and $MAP_{THRESH}$ are determined from look-up tables based on the throttle position. If $MAF_{ERROR}$ exceeds $MAF_{THRESH}$, a MAF residual versus throttle position ($MAF_{RES}$) fault is indicated. Similarly, if $MAP_{ERROR1}$ exceeds $MAP_{THRESH}$, a MAP residual versus throttle position ($MAP_{RES}$) fault is indicated. If both the $MAF_{RES}$ and the $MAP_{RES}$ faults are indicated, the ETC security module 23 generates an air flow fault signal and the air flow fault condition is reported to the vehicle operator. If only one or neither of the $MAF_{RES}$ and $MAP_{RES}$ faults are indicated, the faults are cleared. An air flow fault condition also causes the vehicle to enter a limp-home mode, whereby the engine control system varies fuel and spark to provide the engine torque output.

Figure 3:
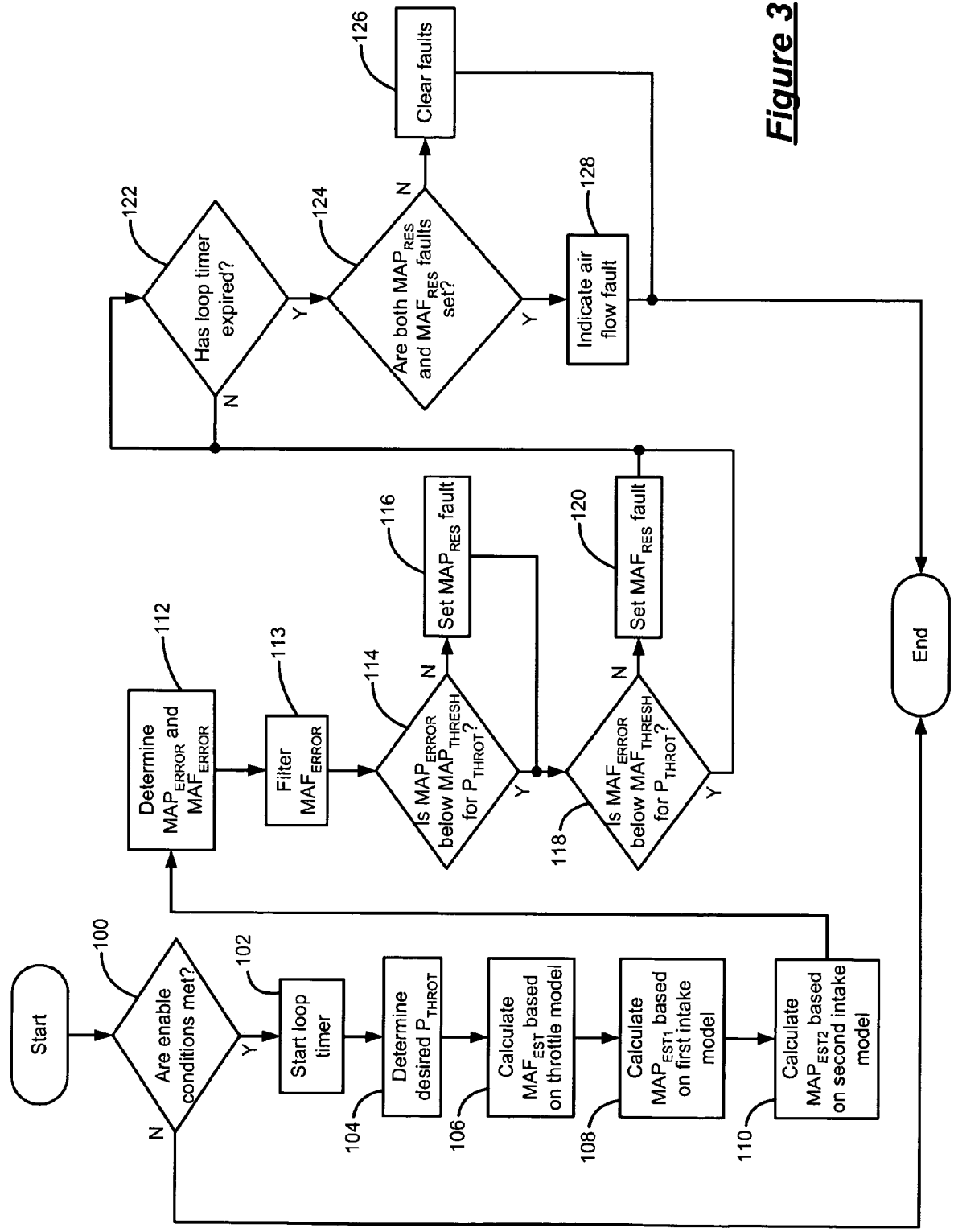
FIG. 3 is a flowchart illustrating steps performed by the engine fault diagnostic system of the present invention.

Referring now to FIG. 3, the engine fault diagnostic will be described in further detail. In step 100, control determines whether enable conditions are met. The enable conditions include, but are not limited to, the engine speed being within a specified range (e.g., 1500–2300 RPM), the IAT being within a specified range and the absence of sensor faults (e.g., no open or short circuits indicated). If the enable conditions are not met, control ends. If the enable conditions are met, control starts a loop timer in step 102.

In step 104, control determines a desired throttle position ($P_{THROT}$) based on the TPS signal. Control calculates $MAF_{EST}$ based on the throttle model in step 106, calculates $MAP_{EST1}$ based on the first intake model in step 108 and calculates $MAP_{EST2}$ based on the second intake model in step 110. In step 112, control determines $MAP_{ERROR}$ based on $MAP_{EST1}$ and the MAP signal and determines $MAF_{ERROR}$ based on $MAF_{EST}$ and the MAF signal. In step 113, the $MAF_{ERROR}$ signal is filtered using a first order lag filter.

In step 114, control determines whether $MAP_{ERROR}$ is below $MAP_{THRESH}$ based on $P_{THROT}$. More specifically, control determines $MAP_{THRESH}$ from a look-up table based on $P_{THROT}$. If $MAP_{ERROR}$ is not below $MAP_{THRESH}$, control sets a $MAP_{RES}$ fault in step 116. If $MAP_{ERROR}$ is below $MAP_{THRESH}$, control determines whether $MAF_{ERROR}$ is below $MAF_{THRESH}$ based on $P_{THROT}$ in step 118. If $MAF_{ERROR}$ is not below $MAF_{THRESH}$, control sets a $MAF_{RES}$ fault in step 120. If $MAF_{ERROR}$ is below $MAF_{THRESH}$, control continues in step 122.

In step 122, control determines whether the loop timer has expired. If the loop timer has not expired, control loops back. If the loop timer has expired, control continues in step 124. In step 124, control determines whether both the $MAP_{RES}$ fault and the $MAF_{RES}$ fault are set. If both faults are not set, control clears any faults (i.e., $MAP_{RES}$ or $MAF_{RES}$ faults) in step 126 and control ends. If both faults are set, control indicates an air flow failure in step 128 and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine fault diagnostic system, comprising:
    a diagnostic module that generates a manifold absolute pressure (MAP) error signal and that generates a mass air flow (MAF) error signal;

a security module that generates an air flow fault when said MAP error signal exceeds a MAP threshold and said MAF error signal exceeds a MAF threshold; and a throttle position sensor that generates a throttle position signal, wherein said security module determines said MAP threshold and said MAF threshold based on said throttle position signal.

2. The engine fault diagnostic of claim 1 further comprising a MAP sensor that generates a MAP signal.

3. The engine fault diagnostic system of claim 2 wherein said MAP error signal is determined based on an estimated MAP and said MAP signal.

4. The engine fault diagnostic of claim 1 further comprising a MAF sensor that generates a MAF signal.

5. The engine fault diagnostic system of claim 4 wherein said MAF error signal is determined based on an estimated MAF and said MAF signal.

6. The engine fault diagnostic of claim 1 further comprising a throttle module that calculates an estimated MAF based on a MAP signal and a throttle position signal, wherein said MAF error signal is based on said estimated MAF and said MAF signal.

7. The engine fault diagnostic of claim 1 further comprising an intake module that calculates an estimated MAP based on a MAF signal and a throttle position signal, wherein said MAP error signal is based on said estimated MAP and said MAP signal.

8. A method of monitoring an air flow condition of an engine intake system, comprising:

determining a manifold absolute pressure (MAP) error;

determining a mass air flow (MAF) error;

generating an air flow fault when said MAP error exceeds a MAP threshold and said MAF error exceeds a MAF threshold; and generating a throttle position signal using a throttle position sensor, wherein said MAP threshold and said MAF threshold are based on said throttle position signal.

9. The method of claim 8 further comprising generating a MAP signal using a MAP sensor, wherein said MAP error is determined based on an estimated MAP and said MAP signal.

10. The method of claim 8 further comprising generating a MAF signal using a MAF sensor, wherein said MAF error is determined based on an estimated MAF and said MAF signal.

11. The method of claim 8 further comprising calculating an estimated MAF based on a MAP signal and a throttle position signal, wherein said MAF error is based on said estimated MAF and said MAF signal.

12. The method of claim 8 further comprising calculating an estimated MAP based on a MAF signal and a throttle position signal, wherein said MAP error is based on said estimated MAP and said MAP signal.

* * * * *